(12) United States Patent
Revol

(10) Patent No.: US 7,115,336 B2
(45) Date of Patent: Oct. 3, 2006

(54) HONEYCOMB STRUCTURE AND METHOD FOR PRODUCTION OF SAID STRUCTURE

(75) Inventor: Stephane Revol, Francheville (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 10/503,589

(22) PCT Filed: Feb. 17, 2003

(86) PCT No.: PCT/FR03/00499

§ 371 (c)(1),
(2), (4) Date: May 6, 2005

(87) PCT Pub. No.: WO03/071626

PCT Pub. Date: Aug. 28, 2003

(65) Prior Publication Data

US 2005/0221150 A1    Oct. 6, 2005

(30) Foreign Application Priority Data

Feb. 19, 2002  (FR) .................................. 02 02074

(51) Int. Cl.
H01M 8/06 (2006.01)
B32B 3/10 (2006.01)
(52) U.S. Cl. ........................ 429/38; 264/497; 419/2; 419/9; 428/613
(58) Field of Classification Search .................... None
See application file for complete search history.

(56) References Cited

U.S. PATENT DOCUMENTS

| | | | | |
|---|---|---|---|---|
| 2,969,413 A | * | 1/1961 | Peters ........................ | 429/235 |
| 3,384,154 A | * | 5/1968 | Milton ........................ | 165/133 |
| 3,616,125 A | * | 10/1971 | Bowling ................. | 416/229 A |
| 4,232,728 A | * | 11/1980 | Fenner et al. ................ | 165/133 |
| 4,458,748 A | * | 7/1984 | Yamada et al. ............. | 165/133 |
| 4,541,879 A | * | 9/1985 | Riel .............................. | 156/64 |
| 5,192,623 A | * | 3/1993 | Gewelber .................... | 428/593 |
| 5,424,139 A | * | 6/1995 | Shuler et al. ................ | 428/596 |
| 5,745,834 A | * | 4/1998 | Bampton et al. ............. | 419/37 |
| 5,776,624 A | * | 7/1998 | Neutzler ....................... | 429/26 |
| 6,066,285 A | * | 5/2000 | Kumar ........................ | 264/439 |
| 6,112,804 A | | 9/2000 | Michaels et al. | |
| 6,255,000 B1 | * | 7/2001 | O'Connor et al. .......... | 428/586 |
| 6,838,202 B1 | * | 1/2005 | Brady et al. .................. | 429/26 |

(Continued)

FOREIGN PATENT DOCUMENTS

DE        197 40 502        3/1999

OTHER PUBLICATIONS

U.S. Appl. No. 60/425,657, filed Nov. 12, 2002.*

(Continued)

Primary Examiner—John J. Zimmerman
(74) Attorney, Agent, or Firm—Oblon, Spivak, McClelland, Maier & Neustadt, P.C.

(57) ABSTRACT

The invention concerns an alveolar structure (1) comprising at least one alveolar zone (2a, 2b) partially delimited by an associated leak tight surface (4a, 4b). According to the invention, each alveolar zone (2a, 2b) is formed of a plurality of metallic layers (8) superimposed parallel to the associated leak tight surface (4a, 4b), each metallic layer (8) comprising a network of passages (10) opening out on either side of said metallic layer (8).

The invention further concerns a method for manufacturing said alveolar structure (1)

Application to fuel cells and heat exchangers.

12 Claims, 4 Drawing Sheets

U.S. PATENT DOCUMENTS

2001/0055694 A1* 12/2001 Wada et al. ............. 428/550
2002/0020298 A1* 2/2002 Drost et al. .............. 96/11
2004/0191106 A1* 9/2004 O'Neill et al. ............ 419/2

OTHER PUBLICATIONS

U.S. Appl. No. 60/424,923, filed Nov. 8, 2002.*

* cited by examiner

HONEYCOMB STRUCTURE AND METHOD FOR PRODUCTION OF SAID STRUCTURE

TECHNICAL FIELD

The technical field of the present invention concerns that of the production of energy requiring a high compactness of the components used. More specifically, the invention relates to alveolar structures used in this specific technical field.

The alveolar structures find application, in particular, in the field of fuel cells and, more specifically, in that of fuel cells comprising a membrane as electrolyte as well as bipolar plates, said plates being composed of alveolar structures.

Furthermore, the invention is also applicable to the field of heat exchangers using alveolar structures.

Finally, the present invention further concerns methods for manufacturing said alveolar structures.

STATE OF THE PRIOR ART

In this field, fuel cells using alveolar structures are known.

Indeed, a fuel cell is an assembly generally comprising a plurality of elementary cells stacked one against the other. In each of the elementary cells of the fuel cell, an electrochemical reaction is created between two reagents that are introduced in a continuous manner into the elementary cells. The fuel normally used is hydrogen or methanol, depending on whether one is in the presence respectively of a cell operating with hydrogen/oxygen type mixtures and in the presence of a cell operating with methanol/oxygen type mixtures.

The fuel is brought into contact with the anode whereas the oxidant, in this instance oxygen, is brought into contact with the cathode.

The cathode and the anode are separated by the intermediary of an ion exchange membrane type electrolyte.

At the level of the anode, an oxidation reaction of the fuel, generally hydrogen, takes place, represented by the following reaction scheme:

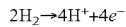

In the same way, at the level of the cathode, a reduction reaction of the oxidant, generally oxygen, takes place, according to the following reaction scheme:

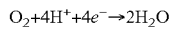

One then has an electrochemical reaction in which the energy created is converted into electrical energy. Protons, $H^+$, circulate from the anode in the direction of the cathode, crossing the electrolyte, to join up with an exterior circuit in order to contribute to the production of electrical energy.

At the same time, at the level of the cathode, one has the production of water, which is continuously evacuated from the electrode-membrane-electrode assembly.

In fuel cells of the prior art, several electrode—membrane—electrode assemblies are stacked one against the other in order to obtain a higher power to that provided by only one of said assemblies. The junction and the electrical continuity between said assemblies is generally achieved by means of conductive plates, said plates also being called bipolar plates.

It is therefore by means of said bipolar plates, being of the alveolar structure type, that one can join the cathode of one assembly with the anode of an adjacent assembly. Said bipolar plates further make it possible to assure the highest possible electrical conductivities, in such a way as to avoid ohmic drops that are detrimental to the output of the fuel cell.

The bipolar plates may also fulfil other functions to that of ensuring the electrical junction.

Indeed, one may for example carry out, through the intermediary of said bipolar plates, the continuous supply in reagent of the anode of a first assembly and the cathode of a second adjacent assembly.

Moreover, the bipolar plates may also serve in the evacuation of products at the level of the cathode, by integrating elements for eliminating the water in excess.

The bipolar plates may further incorporate a heat exchanger serving to avoid any overheating within the stack of electrode-membrane-electrode assemblies.

It should finally be noted that another function of said bipolar plates may reside in the mechanical strength of the electrode-membrane-electrode assemblies, particularly when said assemblies are stacked one against the other. This type of assembly assures an overall volume of the cell of low thickness, which is fully compatible with the planned applications, such as for example that concerning an electrical vehicle.

According to the devices and methods of the prior art, three distinct methods exist for achieving the distribution of the reagents.

One notes firstly a method using channels machined in the ends of the bipolar plates. Said channels are provided to ensure the most homogeneous possible distribution of the reagents on a surface of the electrode with which they are in contact.

Said channels are normally organised in such a way that the reagents injected into said channels wind along a large part of the surface of the electrode. The means implemented to obtain this type of result are horizontal sections spaced by bends descending to 180°. It should be noted that said sections are also capable of recovering and evacuating the water produced at the level of the cathode.

However, it has been observed that this specific arrangement of means would not enable a sufficiently large exchange surface to be obtained to lead to an acceptable yield of electrochemical conversion with a view to an industrial application.

In order to make up for this disadvantage, a second method has been proposed in the prior art.

This method involves using a high porosity metallic foam to add to the metallic parts in which are formed machinings, said metallic foam making it possible to ensure a good distribution of the reagents and the evacuation of different products.

This type of method is, in particular, described in the document U.S. Pat. No. 5,482,792. Two foils of several millimetres thickness are respectively positioned against the anode and against the cathode, and also form the junction with the ends of the bipolar plate.

However, the fact of adding a metallic foam at the level of the bipolar plate contributes to creating a considerable resistance, which leads to a drop in the electrical conductivity within the assembly.

Even if the problem relating to the electrical conduction may be partially resolved by compressing the metallic foam, it turns out that, whatever the case, problems of corrosion persist, notably due to the presence of numerous defects such as strand ruptures within the metallic foam.

According to third method known in the prior art, described in the document U.S. Pat. No. 6,146,780, the bipolar plate comprises a leak tight conductive plate, as well as two parts in metallic foam assuring the contact with the electrodes. This specific arrangement makes it possible to do without the presence of machined and, consequently, expensive metallic elements.

On the other hand, other disadvantages remain in the use of such devices.

Indeed, by using metallic foams as distribution zones for reagents and the evacuation of different products, one cannot correctly control the periodicity of the metallic foam type structure.

Furthermore, an additional disadvantage resides in the impossibility of controlling, in an easy manner, the internal geometry of the alveolar structure, this being reflected by the incapacity to vary the geometry of the distribution zone in the desired manner.

Finally, it should be pointed out that one again encounters some of the aforementioned disadvantages in the alveolar structures used in heat exchangers of the prior art.

DESCRIPTION OF THE INVENTION

The aim of the present invention is therefore to overcome all or part of the disadvantages of alveolar structures of the prior art.

The further aim of the invention is to propose an alveolar structure of simple design, and for which it is possible to perfectly control the internal geometry of its different alveolar zones.

A yet further aim of the present invention is a method of manufacturing an alveolar structure such as that fulfilling the aim of the invention mentioned above.

To do this, a first aim of the invention is an alveolar structure comprising at least one alveolar zone partially delimited by an associated leak tight surface. According to the invention, each alveolar zone is formed of a plurality of metallic layers superimposed parallel to the associated leak tight surface, each metallic layer comprising a network of passages opening out on either side of said metallic layer.

Advantageously, the invention proposes an alveolar structure of simple design in which the internal geometry of the alveolar zones is easily adaptable, depending on the encountered needs.

In this type of alveolar structure, one does not encounter any difficulty linked to assemblies of elements provoking mechanical, thermal or electrical discontinuities within the bipolar plate.

Preferentially, the alveolar structure is indiscriminately integrated in a fuel cell as a bipolar plate, in a fuel cell as a bipolar plate with integrated exchanger or even integrated in a heat exchanger.

A further aim of the present invention is a method for manufacturing said type of alveolar structure. According to this method, each metallic layer is formed by carrying out the following operations:

depositing a layer of metallic powder;
partially solidifying by laser the layer of deposited metallic powder, leading to the formation of solidified parts and non-solidified parts, said solidified parts defining the perimeter of the passages of the metallic layer.

Preferentially, for each alveolar zone, the metallic layers are formed successively, the associated leak tight surface constituting a support for the first metallic layer to be formed, the solidified and non-solidified parts of any metallic layer formed constituting a support for the following metallic layer to be formed.

Preferentially, for each alveolar zone, when all of the metallic layers have been formed, the networks of passages of the metallic layers are obtained by eliminating the non-solidified parts of the metallic layers.

Furthermore, one may provide that the operation of partial solidification by laser of a layer of deposited metallic powder is also capable of making the solidified parts obtained integral with the solidified parts of the metallic layer on which they are lying.

The metallic layers are preferably composed of a material chosen from among stainless steels, aluminium and its alloys, nickel and its alloys such as Ni—Cr, and a mixture of at least two of the aforementioned elements.

Furthermore, the metallic layers comprise at least one binder such as bronze. This advantageously makes it possible to obtain alloys for which a sintering operation can be carried out at low temperature.

Other advantages and characteristics of the invention will become clear in the detailed, non-limitative description that follows.

BRIEF DESCRIPTION OF THE DRAWINGS

The description will be made with respect to the appended drawings, in which.

DETAILED DESCRIPTION OF PREFERRED EMBODIMENTS

Figure 1:
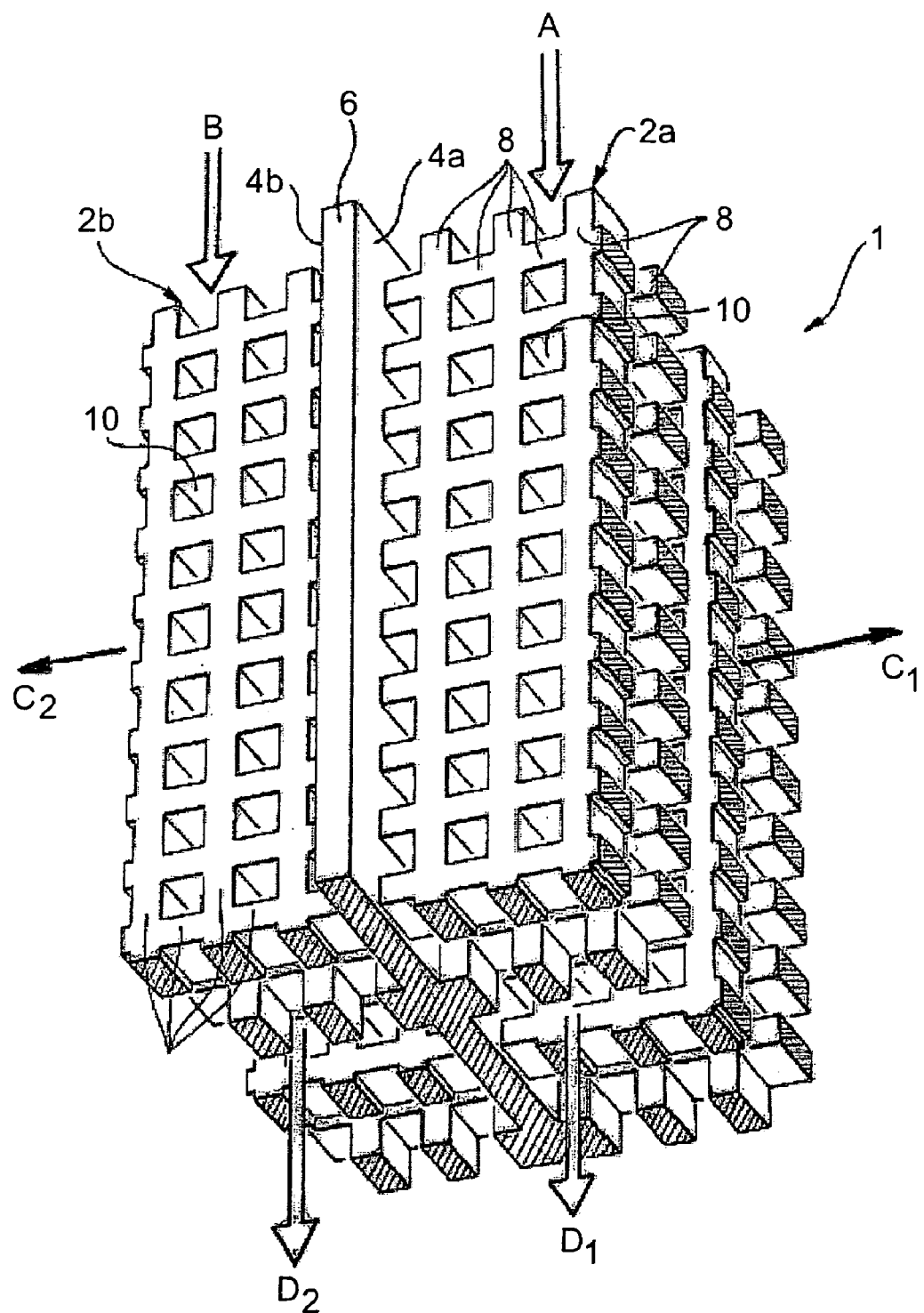
FIG. 1 represents a perspective view of an alveolar structure according to a preferred embodiment of the invention.
Figure 2:
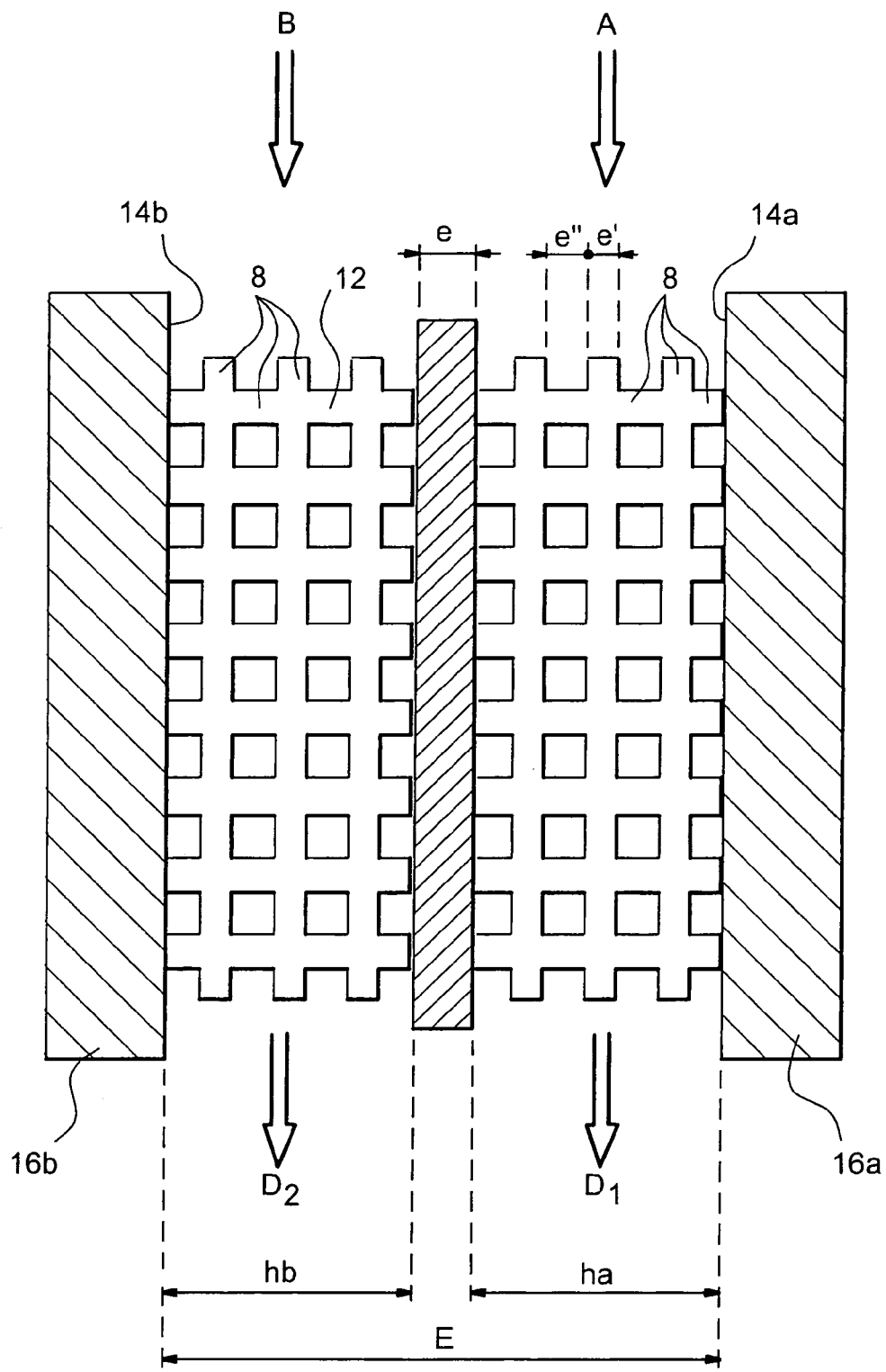
FIG. 2 represents a frontal view of the alveolar structure of FIG. 1, in contact with two elements to be linked together.

With reference to FIGS. 1 and 2, an alveolar structure 1 according to a preferred embodiment of the invention is shown, said alveolar structure being, in particular, capable of functioning with a fuel cell or with a heat exchanger (not shown).

The alveolar structure 1 according to the invention comprises at least one alveolar zone 2a, 2b intended to be crossed by at least one fluid. According to the preferred embodiment of the invention represented in FIGS. 1 and 2, the alveolar structure 1 comprises two alveolar zones 2a, 2b, each being intended to cooperate with a respective element 16a, 16b comprising a surface to contact 14a, 14b. The elements 16a, 16b visible in FIG. 2 may belong to a heat exchanger or a fuel cell.

It should be noted that it is also possible to propose an alveolar structure 1 only having one alveolar zone 2a, 2b.

The alveolar zones 2a, 2b are partially delimited by associated leak tight surfaces 4a, 4b.

The first 4a as well as the second 4b belong to a conductive base plate 6, said base plate 6 also being leak tight to fluids flowing within the alveolar zones 2a, 2b.

Each alveolar zone 2a, 2b is formed of metallic layers 8 superimposed parallel to the associated leak tight surface 4a, 4b. Each metallic layer 8 comprises a network of passages 10 opening out on either side of the metallic layer 8.

In each alveolar zone 2a, 2b, the metallic layers 8, substantially planar, are therefore stacked one against the other, on a large part of the associated leak tight surface 4a, 4b. Each metallic layer 8 comprises a network of passages comprising a plurality of passages 10, of identical or different shape, crossing each metallic layer 8 along an axis substantially perpendicular to the associated leak tight surface 4a, 4b. This specific arrangement of the metallic layers 8 therefore leads to obtaining volumic, conductive and porous alveolar zones 2a, 2b.

Each of the metallic layers 8 may have an identical or different network of passages 10 of networks of passages 10 formed on the two directly adjacent metallic layers 8.

Preferably, and with reference to FIG. 2, the alveolar structure 1 has a thickness "E" of around 6mm, said thickness corresponding to the thickness "e" of the conductive base plate 6 added to the sum of the heights "ha" and "hb" of the two alveolar zones 2a, 2b.

Furthermore, still with reference to FIG. 2, the metallic layers 8 may be of different thickness such as "e'" or "e''", these values being preferably less than 0.5mm and, more specifically, between around 0.1mm and 0.2mm.

Thus, by varying firstly the thicknesses "e'" and "e''" of the metallic layers 8, and secondly the distribution and the geometry of the networks of passages 10, one may obtain alveolar zones 2a, 2b of average open porosity between a value strictly superior to 0% and 90%.

In operation, and with reference to FIGS. 1 and 2, the alveolar structure 1 comprises two alveolar zones 2a, 2b, each being intended to cooperate with a distinct surface 14a, 14b respectively belonging to the elements 16a, 16b. The elements 16a, 16b may belong to a heat exchanger or a fuel cell. Each alveolar zone 2a, 2b is respectively supplied with a fluid $F_1$ in the alveolar zone 2a, and by a fluid $F_2$ in the alveolar zone 2b. It should be pointed out that said fluids $F_1$ and $F_2$ may themselves be mixtures of several fluids and that the supply of fluids is preferably carried out in a continuous manner.

The arrows A and B respectively symbolise the supplies in fluids $F_1$ and $F_2$, respectively carried out in the alveolar zones 2a and 2b.

During their introduction into the alveolar structure 1, the fluids $F_1$ and $F_2$ flow in the totality of the volume of the alveolar zones 2a, 2b and diffuse up to the surfaces 14a, 14b with which they have to come into contact. The arrows $C_1$ and $C_2$ indicate a principal direction of diffusion of the fluids $F_1$ and $F_2$ in each of the alveolar zones 2a, 2b.

To reach the surfaces 14a, 14b to be contacted, the fluids $F_1$ and $F_2$ pass through the passages 10 formed in the metallic layers 8. With this type of arrangement of means, the distribution of the fluids $F_1$ and $F_2$ on the surfaces to be contacted is assured to be as homogeneous as possible.

The evacuation of the fluids $F_1$ and $F_2$ is respectively symbolised by the arrows $D_1$ and $D_2$.

According to a first application of the invention, the alveolar structure 1 is intended to be used in a fuel cell. In this specific case, the two alveolar zones 2a, 2b are reagent distribution zones, and the surfaces 14a, 14b that have to contact these distribution zones are electrode surfaces 16a, 16b each belonging to an electrode-membrane-electrode assembly (not shown) of a cell of a fuel cell. The alveolar structure 1 is then a bipolar plate for a fuel cell.

In the same way as in the bipolar plates of the prior art, the distribution zones made up of the alveolar zones 2a, 2b may also serve for the evacuation of different products, such as water, formed during the electrochemical reactions at the electrodes.

It should also be noted that the alveolar structure 1, depending on the needs encountered, may only comprise a single reagent distribution zone. This specific embodiment arises in cases where a single electrode of a fuel cell is to be supplied with reagent.

Figure 3:
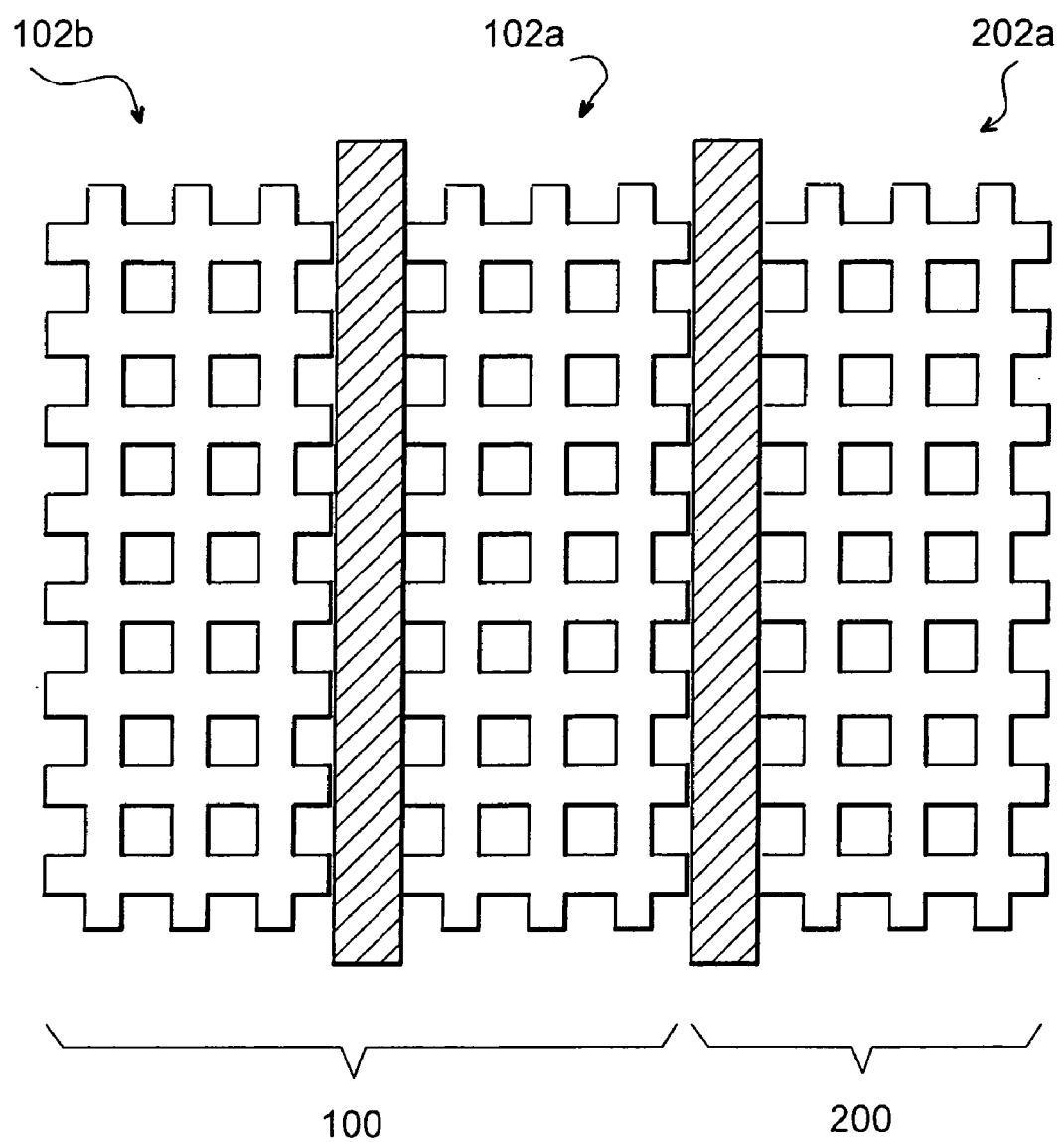
FIG. 3 represents a frontal view of an alveolar structure according to another preferred embodiment of the invention, FIG. 4 schematically represents a perspective view of an alveolar zone during manufacture, after the step of depositing a layer of metallic powder, and FIG. 5 schematically represents a perspective view of an alveolar zone during manufacture, after the step of partial solidification of a layer of deposited metallic powder.

Furthermore, with reference to FIG. 3 and according to a second application of the present invention, by combining two alveolar structures 100 and 200, one can obtain a bipolar plate comprising an integrated heat exchanger.

Indeed, a first alveolar structure 100 comprising two alveolar zones 102a, 102b is juxtaposed to a second alveolar structure 200 comprising a single alveolar zone 202a. One can bring said alveolar structures 100, 200 into contact with each other, for example by simple pressing, which forms a structure comprising three distinct alveolar zones 102a, 102b, 202a, the alveolar zone 102a located in the middle of the two others being a heat exchange zone and the two other zones 102b, 202a, located at the ends of the assembly, correspond to zones for distributing reagents to the electrodes.

According to a third application of the invention, the alveolar structure 1 may also be used in a heat exchange type device, as a heat exchange zone. Its operation is then similar to that of bipolar plates, and the fluids injected into the alveolar zones 2a, 2b are a cooling liquid, such as water.

In this type of application, the alveolar zones 2a, 2b are cooling liquid distribution zones, said cooling liquid being intended to spread out over the totality of the surfaces 14a, 14b to be cooled, then to be evacuated from the alveolar structure 1 along a direction represented by the arrows $D_1$ and $D_2$ of FIG. 1.

The invention further relates to a method of manufacturing an alveolar structure 1, as describe here above.

Said method of manufacturing consists, from the conductive base plate 6, in forming at least one alveolar zone 2a, 2b.

Figure 4:
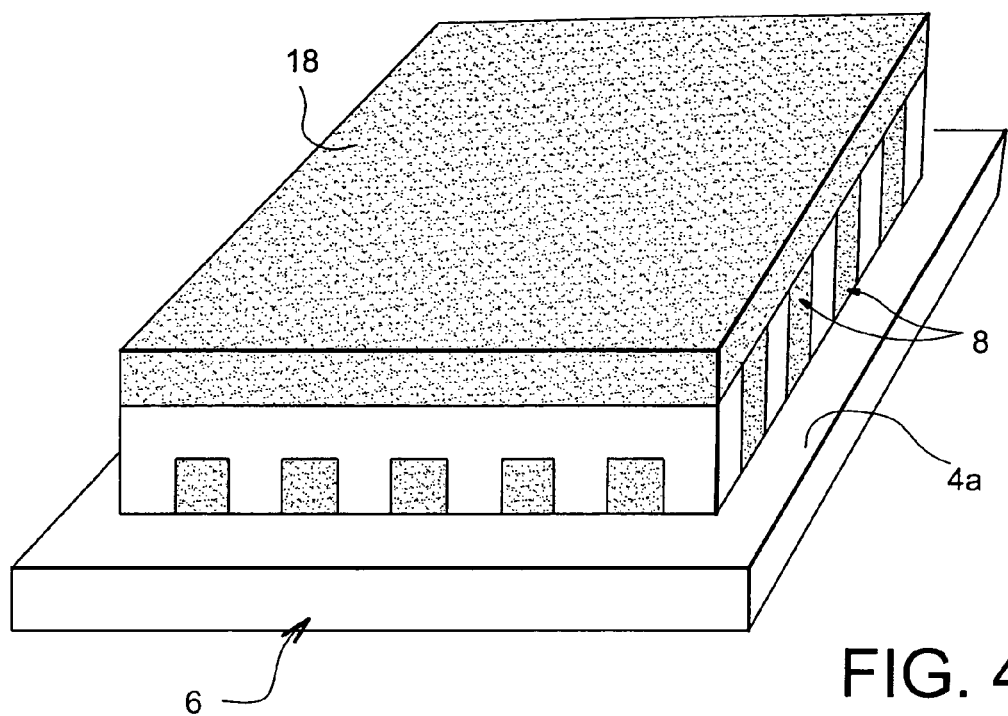
Figure 5:
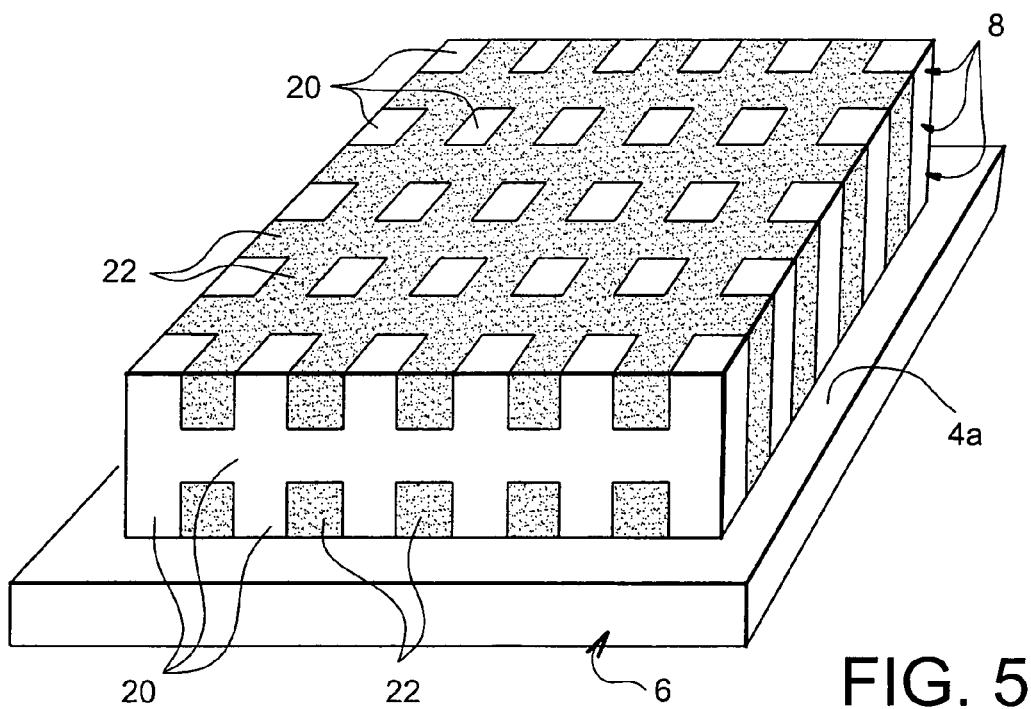

With reference to FIGS. 4 and 5, to result in one of the alveolar zones 2a, 2b, one repeats two successive operations several times, enabling one to result in the formation of a metallic layer 8. With reference to FIG. 4, the first operation consists in depositing a layer of metallic powder 18 on the last metallic layer 8 that has just been deposited. It should be noted that for the formation of the first metallic layer 8, this first operation consists in depositing a layer of metallic powder 18 on the associated leak tight surface 4a, 4b.

Subsequently, the operation consists in partially solidifying, by laser, the layer of deposited metallic powder 18, in such a way as to obtain solidified parts 20 and non-solidified parts 22. It is pointed out that the non-solidified parts 22 are formed of particles of powder of the layer of metallic powder 18.

The location and quantities of solidified parts 20 and non-solidified parts 22 are determined as a function of the desired network of passages 10 on the metallic layer 8 being formed. Indeed, the solidified parts 20 define the perimeter of the passages 10, whereas the location of the non-solidified parts 22 correspond to the desired location for the passages 10 of said metallic layer 8.

For each alveolar zone 2a, 2b, one thus repeats this succession of two steps, and this is done as many times as there are metallic layers 8 constituting the alveolar zone 2a, 2b concerned.

It should be noted that after the formation of any metallic layer 8, said layer has solidified parts 20 and non-solidified parts 22, the whole of these parts 20, 22 constituting a support for carrying out the deposition of the following metallic layer 8.

In order to deposit the layers of metallic powder 18, one may resort to any type of method known to the prior art. Preferentially, one mechanically deposits the layers of metallic powder 18.

In order to carry out the step of partial solidification of the layer of deposited metallic powder 18, one uses methods known to the prior art and using laser type means.

By way of example, on may cite selective laser sintering, direct powder deposition, rapid fabrication and production, laser sintering or even production of microsystems.

In a general manner, the methods mentioned above use laser type means to provide locally sufficient power to sinter or melt part of the layer of metallic powder 18, at a precise and predetermined position. This operation may be carried out several times in order to obtain a plurality of solidified parts 20.

It is then imperative to carry out a precise positioning of the laser type means in relation to the layer of metallic powder 18 intended to undergo the partial solidification operation, in such a way that said layer of metallic powder 18 is located in a focal zone of the laser type means. Thus, in certain cases encountered, one is in a position to solidify part of the layer of powder 18 without solidifying the non-solidified part(s) 22 of the metallic layer 8 on which it is lying.

It should be noted that it is possible to carry out this method with the aid of CAD type means, said means making it possible to adjust, while the method is in progress, the positions relative to the laser type means and the different layers of metallic powder 18.

It should also be pointed out that the operation of partial solidification by laser of a layer of metallic powder 18 also makes it possible to make the solidified parts 20 obtained integral with the solidified part(s) of the metallic layer 8 on which they are lying. This characteristic is also valid for the first metallic layer 8 formed, the solidified parts 20 obtained being made integral with the associated leak tight surface 4*a*, 4*b* of the plate 6.

When the assembly of metallic layers 8 intended to form an alveolar zone 2*a*, 2*b* has been formed, one then has a block comprising exclusively solidified parts 20 and non-solidified parts 22. Thus, in order to obtain the networks of passages 10 located at the level of the non-solidified parts 22, it is necessary to eliminate the powder constituting said parts 22. This elimination may quite simply be carried out by evacuation of the grains of powder, said grains being easily extractable from the block, creating, as they are extracted, the networks of passages 10 of the metallic layers 8.

After elimination of all of the non-solidified parts 22, the alveolar zone 2*a*, 2*b* is obtained, formed of a plurality of solidified parts 20 that are made integral with each other.

Obviously, various modifications may be made by those skilled in the art to the alveolar structure 1 and to the method of manufacturing said type of structure that has just been described, uniquely by way of example and in nowise limitative.

The invention claimed is:

1. A bipolar plate for a fuel cell comprising:
   at least two alveolar zones juxtaposed with a common base plate, each zone being partially delimited by an associated leak tight surface of the common base plate, wherein each alveolar zone is formed of a plurality of metallic layers superimposed parallel to the associated leak tight surface, each metallic layer comprising a network of passages opening out on either side of said each metallic layer.

2. The bipolar plate according to claim 1, integrated in a fuel cell.

3. The bipolar plate according to claim 1, integrated in a fuel cell with an integrated exchanger.

4. The bipolar plate according to claim 1, integrated in a heat exchanger.

5. A method of manufacturing an alveolar structure including at least one alveolar zone partially delimited by an associated leak tight surface.
   wherein each alveolar zone is formed of a plurality of metallic layers superimposed parallel to the associated leak tight surface, each metallic layer comprising a network of passages opening out on either side of said each metallic layer, wherein each metallic layer is formed by:
   depositing a layer of metallic powder;
   partially solidifying by laser the layer of deposited metallic powder, leading to formation of solidified parts and non-solidified parts, the solidified parts defining a perimeter of the network of passages of the metallic layer.

6. A method according to claim 5, wherein for each alveolar zone, the metallic layers are formed successively, the associated leak tight surface constituting a support for a first of the metallic layers to be formed, the solidified and non-solidified parts of any metallic layer formed constituting a support for following of the metallic layers to be formed.

7. A method according to claim 5, wherein for each alveolar zone, when all of the metallic layers have been formed, the network of passages of the metallic layers are obtained by eliminating the non-solidified parts of the metallic layers.

8. A method according to claim 5, wherein the partially solidifying by laser of a layer of deposited metallic powder is also capable of making the solidified parts obtained integral with the solidified parts of the metallic layer on which they are lying.

9. A method according to claim 5, wherein the partially solidifying by laser of the first layer of deposited metallic powder is also capable of making the solidified parts obtained integral with the associated leak tight surface on which they are lying.

10. A method according to claim 5, wherein the metallic layers are composed of a material chosen from among stainless steels, aluminium and its alloys, including Ni—Cr, and a mixture of at least two of the aforementioned elements.

11. A method according to claim 10, wherein the metallic layers comprise at least one binder.

12. A method according to claim 10, wherein the at least one binder comprises bronze.

* * * * *